United States Patent [19]

Cavallaro

[11] Patent Number: 5,687,894
[45] Date of Patent: Nov. 18, 1997

[54] BICYCLE RACK

[76] Inventor: Cynthia A. Cavallaro, 3857 Camino Real, Sarasota, Fla. 34239

[21] Appl. No.: 499,732

[22] Filed: Jul. 7, 1995

[51] Int. Cl.⁶ .................................................. B62J 11/00
[52] U.S. Cl. ...................... 224/457; 224/448; 224/454; 224/458
[58] Field of Search .................. 224/422, 424, 224/430, 448, 454, 452, 455, 457, 458, 528

[56] References Cited

U.S. PATENT DOCUMENTS

| | | | |
|---|---|---|---|
| 2,554,776 | 5/1951 | Comeau | 224/528 |
| 3,286,891 | 11/1966 | Jones, Jr. | 224/455 |
| 3,521,799 | 7/1970 | Rundel | 224/528 |
| 3,934,770 | 1/1976 | Larsen | 224/424 |
| 4,487,344 | 12/1984 | Blackburn et al. | 224/424 |
| 4,666,071 | 5/1987 | Irwin et al. | 224/422 |
| 4,928,863 | 5/1990 | Morgan . | |
| 5,090,717 | 2/1992 | Belka | 224/422 |

FOREIGN PATENT DOCUMENTS

| | | | |
|---|---|---|---|
| 656020 | 4/1929 | France | 224/32 A |
| 653768 | 5/1951 | United Kingdom | 224/39 |
| 688949 | 3/1953 | United Kingdom | 224/39 |

*Primary Examiner*—Linda J. Sholl
*Attorney, Agent, or Firm*—Charles J. Prescott

[57] ABSTRACT

A bicycle rack connectable to the rear frame of a bicycle for carrying a folded beach chair. A generally rectangular rack frame is formed of elongated strut members and extends laterally and then upwardly from each lower corner thereof to define a folded upright beach chair support means. The rack frame is connected to either the rear of the bicycle frame and/or to one side edge of a rear carrying platform disposed generally horizontally above the rear wheel as an optional existing feature of the bicycle. An alternate embodiment provides two rack frame members which extend downwardly along either side of the rear wheel and frame from an included rear carrying platform in saddle fashion where an existing rear carrying platform is not available.

1 Claim, 2 Drawing Sheets

U.S. Patent    Nov. 18, 1997    Sheet 1 of 2    5,687,894
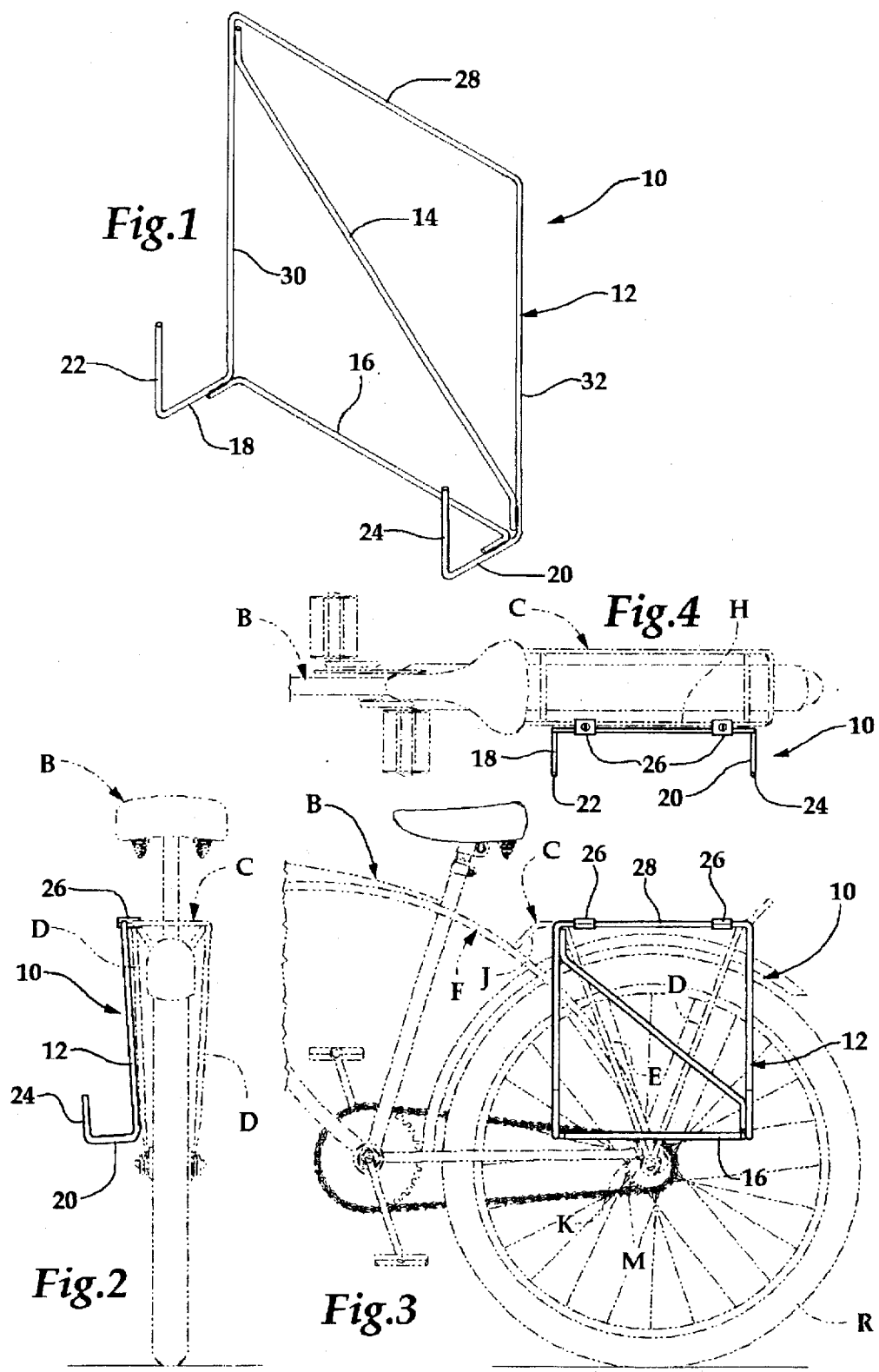

BICYCLE RACK

BACKGROUND OF THE INVENTION

1. Field of the invention

This invention relates generally to rack attachments for bicycles, and more particularly to a bicycle rack for carrying one or more folded beach chairs and the like while riding the bicycle.

2. Prior Art

Bicycles have long been used for more than just exercise and recreation. On many occasions, bicycles are also used to transport rider and other articles to be used at an intermediate or final destination. In most instances, the bicycle rider wishes to carry other articles for use at the intermediate or final destination of the trip. However, many of the articles to be carried on the bicycle are normally hand-carried items which interfere with the ability of the rider to safely maneuver and control the bicycle. Not only is the bicycle rider in jeopardy, but others along the same path or roadway may also be potential victims of an accident involving the hand-carrying of items.

It is common practice for those living in proximity to a beach access or park setting to travel there by bicycle. Here again, these individuals will transport beach and picnic gear on the bicycle, again many times by hand carrying. One such item desired by many bicyclists at a beach setting is a sport or surf board. U.S. Pat. No. 4,928,863 teaches an invention by Morgan for carrying such sport boards safely positioned and supported by this device along the rear frame of the bicycle.

Another item well known to be useful at either a beach or a park setting as a destination of the bicyclist is a foldable beach chair and the like. Many other specialty racks have been available to transport various other items in addition to the above-referenced U.S. patent, but none have been designed primarily for the safe transporting of a folded beach chair carried on the bicycle frame.

The present invention provides a rack connectable to the rear frame of a bicycle or its rear carrying platform which is specifically structured for carrying one or more folded beach chairs safely. The invention is economical to fabricate and easily installable and adjustable onto the rear frame of virtually any bicycle without the need for specialized tools or equipment. The preferred embodiment may be connected onto either the left or the right hand side of the rear frame and is easily adjustable fore and aft longitudinally with respect to the bicycle for optimal positioning depending upon the particular shape of the folded beach chair.

BRIEF SUMMARY OF THE INVENTION

This invention is directed to a bicycle rack connectable to the rear frame of a bicycle for carrying a folded beach chair. A generally rectangular rack frame is formed of elongated strut members and extends laterally and then upwardly from each lower corner thereof to define a folded upright beach chair support means. The rack frame is connected to either the rear of the bicycle frame and/or to one side edge of a rear carrying platform disposed generally horizontally above the rear wheel where available as an optional existing feature of the bicycle. An alternate embodiment provides two rack frame members which extend downwardly along either side of the rear wheel and frame from an included rear carrying platform in saddle fashion where an existing rear carrying platform is not available.

It is therefore an object of this invention to provide a bicycle rack for carrying one or more folded beach chairs.

It is yet another object of this invention to provide a bicycle rack for carrying a folded beach chair which is easily installable onto either right hand or left hand side of the rear frame of the bicycle.

It is yet another object of this invention to provide a bicycle rack which will receive supportive clamping engagement from an existing rear carrying platform of the bicycle where available.

It is yet another object of this invention to provide a bicycle rack which will carry two folded beach chairs safely during operation of the bicycle and also providing a rear carrying platform positioned above the rear wheel where none is provided by the bicycle manufacturer.

In accordance with these and other objects which will become apparent hereinafter, the instant invention will now be described with reference to the accompanying drawings.

BRIEF DESCRIPTION OF THE DRAWINGS

FIG. 1 is a perspective view of the preferred embodiment of the invention.

FIG. 2 is a rear end elevation view of the invention of FIG. 1 shown in position on a bicycle shown in phantom.

FIG. 3 is a side elevation view of FIG. 2.

FIG. 4 is a top plan view of FIG. 3.

DETAILED DESCRIPTION OF THE INVENTION

Figure 5:
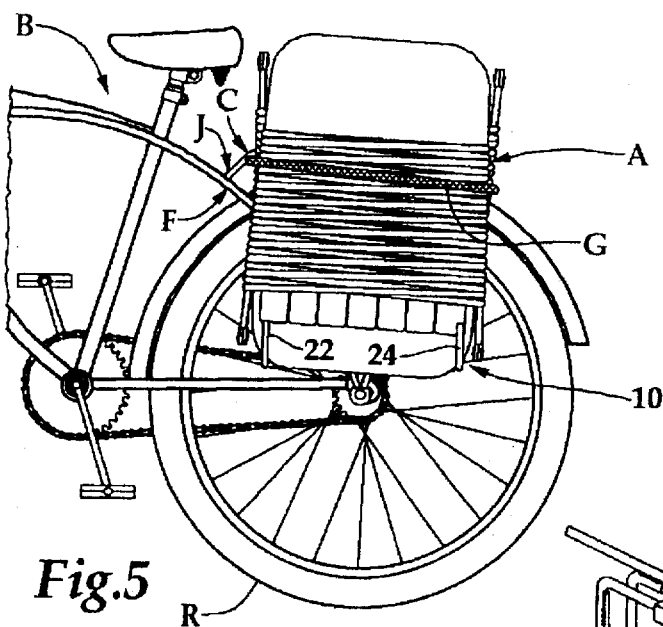
FIG. 5 is a side elevation view similar to FIG. 3 showing a folded beach chair in carrying position being supported by the device of FIG. 1.

Referring now to the drawings, the preferred embodiment of the invention is shown generally at numeral 10 in FIGS. 1 to 6. The device 10 includes a rectangular rack frame 12 formed of elongated cylindrical strut members 16, 28, 30 and 32 which define side struts 30 and 32, upper strut 28 and lower strut 16 with a diagonal strut 14 for additional reinforcement and stability. These strut members are formed of cylindrical metal rod material and welded together as shown.

The upright side struts 30 and 32 extend laterally at an orthogonal angle from each lower corner of the rack frame 12 to define lateral legs 18 and 20. Upright legs 22 and 24 dependently extend from the lateral legs 18 and 20, respectively, upright legs 22 and 24 being substantially shorter than side struts 30 and 32. Lower strut member 16 includes orthogonal end portions which are welded to support these lateral legs 18 and 20 as shown.

The device 10 may be connected to either the rear frame F of bicycle B, the rear frame F including a mount M for a rear wheel R. Many bicycles B include a rear carrying platform shown at C in phantom in FIGS. 2, 3 and 4 and partially shown at H in FIG. 6. These existing rear carrying platforms C are connected to the rear frame F at J in FIGS. 3 and 5 and at K forming the lower distal end of elongated platform supports D and E downwardly extending from either side of the rear carrying platform itself. The lower distal end K includes an aperture which is interconnectable to the rear frame F at rear wheel mount M.

Figure 6:
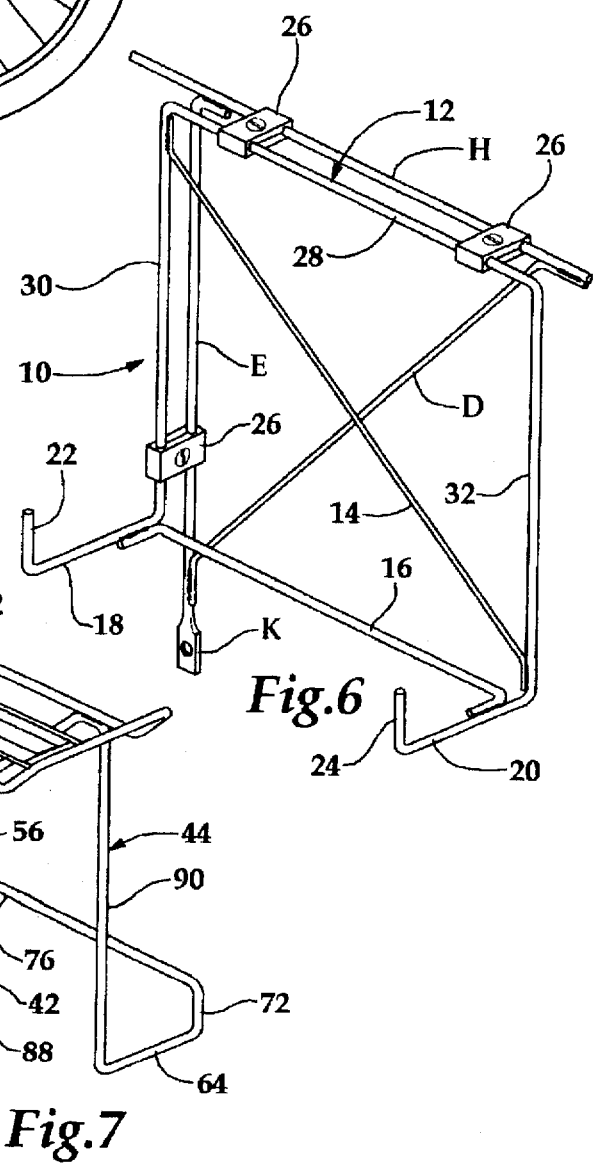
FIG. 6 is a perspective view similar to FIG. 1 with the addition of a portion of an existing rear carrying platform of the bicycle as support structure.

When a rear carrying platform C has been previously installed, the upper horizontal strut 28 of rack frame 12 may be connected by split clamps 26 to the side edge member H of the rear carrying platform C. Although not required, an additional split clamp 26 interconnects side strut member 30 and support E as seen in FIG. 6.

By this arrangement, a folded beach chair A shown in FIG. 5 positioned as shown is supported by lateral legs 18 and 20 and laterally supported between upright legs 22 and 24 and the rear carrying platform C. For additional stability, an elastic cord G having releasible connecting hooks at each end thereof may be stretched between, for example, the side strut members 30 and 32 as seen in FIG. 5.

This preferred embodiment 10 may be attached to either the right hand or left hand side of the rear frame F and also may be adjusted fore and aft with end clamps 26 with respect to side member H as desired to accommodate a particular folded beach chair configuration.

Figure 7:
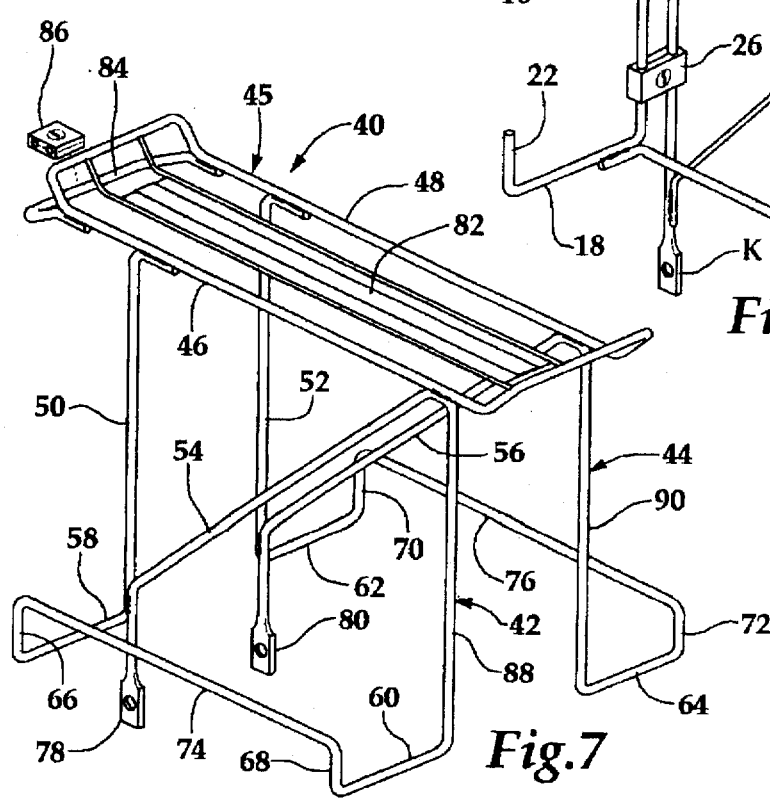
FIG. 7 is a perspective view of an alternate embodiment of the invention which provides means for carrying two folded beach chairs and a rear carrying platform where none is previously provided.

Referring now to FIG. 7, an alternate embodiment is there shown generally at numeral 40 and is provided where either two separate folded beach chairs A are to be carried and/or where no rear carrying platform C is provided with the bicycle B. This embodiment 40 includes two generally rectangular rack frames 42 and 44 which dependently extend downwardly from a carrying platform 48, the entire arrangement 40 being formed by slender cylindrical metal rod material.

The rear platform 48, generally elongated and rectangular in configuration having upturned end portions for package stability, also includes a solid central portion 82 for supporting articles to be carried thereon. Interconnection to the rear frame F is, in part, accomplished by member 84 and split clamp 86 interengaging the rear frame F in a fashion similar to that shown in FIGS. 3 and 5 with respect to rear carrying platform C. Additional support for this embodiment 40 is provided at 78 and 80 for engagement with the rear frame F at rear wheel mount M as previously described.

The rack frames 42 and 44 each include upper horizontal struts 46 and 48 which also form the side members of rear carrying platform 45. The lower ends of side struts 50/88 and 52/90 extend laterally outwardly from one another to define lateral legs 58/60 and 52/64, respectively, then upwardly to define upright legs 66/68 and 70/72, respectively, to be tied together by horizontal strut members 74 and 76, respec-tively. Again, as previously described, the horizontal lateral legs 58/60 and 62/64 provide vertical support for a folded beach chair A, while upright legs 66/68 and 70/72 provide lateral support for the folded beach chair A which, when positioned similar to that shown in FIG. 5, will leaningly be supported against side members 46 and 48.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. For a bicycle having a bicycle frame, a rear portion of which provides a mount for a rear wheel, the bicycle being of the type which includes a rear carrying platform disposed generally horizontally above the rear wheel, a bicycle rack for carrying a folded beach chair comprising:

an upright rack frame generally lying in a plane and formed of elongated spaced apart slender upper and lower struts and elongated spaced apart slender front and rear side struts, said rack frame positioned against a side of the rear portion of the bicycle frame;

each said side strut extending laterally at each lower end thereof to define a generally lateral leg depending from said side strut member and then extending upwardly to define an upright leg depending from said lateral leg, said upright leg being substantially shorter than, and spaced from a corresponding said side strut;

said rack frame also including an elongated diagonal stiffening strut connected to, and extending between an upper end of one said side strut to a lower end of another said side strut;

said lateral and upright legs spaced apart and cooperating to define a means for supporting and preventing lower lateral movement of the folded beach chair in an upright orientation against said upper strut member;

clamping means for directly connecting said upper strut, in spaced substantially aligned relation, to a side edge of the rear carrying platform and for directly connecting said front side strut, in spaced generally aligned relation, to a generally upright support of the rear carrying platform.

* * * * *